(12) United States Patent
Uemura

(10) Patent No.: US 8,393,213 B2
(45) Date of Patent: Mar. 12, 2013

(54) SENSOR DEVICE

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 679 days.

(21) Appl. No.: 12/632,122

(22) Filed: Dec. 7, 2009

(65) Prior Publication Data

US 2010/0154539 A1    Jun. 24, 2010

(30) Foreign Application Priority Data

Dec. 19, 2008    (JP) .................................. 2008-323684

(51) Int. Cl.
*G01C 23/00* (2006.01)

(52) U.S. Cl. ........................................................ 73/510

(58) Field of Classification Search .................... 73/510, 73/504.04, 504.12, 514.01
See application file for complete search history.

(56) References Cited

U.S. PATENT DOCUMENTS

| 6,067,488 | A | 5/2000 | Tano |
| 7,281,406 | B2 | 10/2007 | Mase |
| 7,533,569 | B2 * | 5/2009 | Sheynblat ........................ 73/510 |
| 2008/0234935 | A1 | 9/2008 | Wolf et al. |
| 2009/0249876 | A1 | 10/2009 | Uemura |

FOREIGN PATENT DOCUMENTS

| CN | 1174144 A | 2/1998 |
| CN | 101680761 A | 3/2010 |
| EP | 1 489 381 A2 | 12/2004 |
| JP | 2005-283481 A | 10/2005 |
| WO | 2004/070318 A1 | 8/2004 |
| WO | 2004/079374 A1 | 9/2004 |

OTHER PUBLICATIONS

European Search Report dated Nov. 29, 2010 for Appl. No. EP 09179072.
Wang, et al.; "Monolithic Micromachined Silicon Accelerometer Based on Thick Film Multi-Integration", Department of Instrument Science and Engineering, Southeast University, Najing 210096, China Instrument Technique and Sensor, No. 1, 2007.

* cited by examiner

*Primary Examiner* — John Chapman, Jr.
(74) *Attorney, Agent, or Firm* — Pearne & Gordon LLP

(57) ABSTRACT

An sensor device with high detection accuracy. A time-point measurement unit is provided for measuring time-point information and adding the time-point information to an angular velocity sensing signal and an acceleration sensing signal. The angular velocity sensing signal and the acceleration sensing signal are linked by the time-point information. This structure enables output of the angular velocity sensing signal and the acceleration sensing signal linked by the time-point information. Accordingly, the angular velocity sensing signal can be accurately corrected using the acceleration sensing signal. The detection accuracy of the sensor device thus improves.

4 Claims, 4 Drawing Sheets

FIG. 2

| $T_{01}$ | $Y_{011}$ | $Y_{012}$ | - - - | $Y_{016}$ | $Y_{017}$ | $Y_{018}$ |
|---|---|---|---|---|---|---|
| $T_{02}$ | $Y_{021}$ | $Y_{022}$ | - - - | $Y_{026}$ | $Y_{027}$ | $Y_{028}$ |
| $T_{03}$ | $Y_{031}$ | $Y_{032}$ | - - - | $Y_{036}$ | $Y_{037}$ | $Y_{038}$ |
| $T_{04}$ | $Y_{041}$ | $Y_{042}$ | - - - | $Y_{046}$ | $Y_{047}$ | $Y_{048}$ |
| ⋮ | | | | | | |
| $T_{96}$ | $Y_{961}$ | $Y_{962}$ | - - - | $Y_{966}$ | $Y_{967}$ | $Y_{968}$ |
| $T_{97}$ | $Y_{971}$ | $Y_{972}$ | - - - | $Y_{976}$ | $Y_{977}$ | $Y_{978}$ |
| $T_{98}$ | $Y_{981}$ | $Y_{982}$ | - - - | $Y_{986}$ | $Y_{987}$ | $Y_{988}$ |
| $T_{99}$ | $Y_{991}$ | $Y_{992}$ | - - - | $Y_{996}$ | $Y_{997}$ | $Y_{998}$ |

FIG. 3

| $T_{01}$ | $G_{011}$ | $G_{012}$ | - - - | $G_{016}$ | $G_{017}$ | $G_{018}$ |
|---|---|---|---|---|---|---|
| $T_{02}$ | $G_{021}$ | $G_{022}$ | - - - | $G_{026}$ | $G_{027}$ | $G_{028}$ |
| $T_{03}$ | $G_{031}$ | $G_{032}$ | - - - | $G_{036}$ | $G_{037}$ | $G_{038}$ |
| $T_{04}$ | $G_{041}$ | $G_{042}$ | - - - | $G_{046}$ | $G_{047}$ | $G_{048}$ |
| ⋮ | | | | | | |
| $T_{96}$ | $G_{961}$ | $G_{962}$ | - - - | $G_{966}$ | $G_{967}$ | $G_{968}$ |
| $T_{97}$ | $G_{971}$ | $G_{972}$ | - - - | $G_{976}$ | $G_{977}$ | $G_{978}$ |
| $T_{98}$ | $G_{981}$ | $G_{982}$ | - - - | $G_{986}$ | $G_{987}$ | $G_{988}$ |
| $T_{99}$ | $G_{991}$ | $G_{992}$ | - - - | $G_{996}$ | $G_{997}$ | $G_{998}$ |

SENSOR DEVICE

BACKGROUND OF THE INVENTION

1. Field of the Invention

The present invention relates to sensor devices used typically in vehicles and a range of electronic devices.

2. Background Art

As shown in FIG. 5, a conventional sensor device includes angular velocity sensor 1 for outputting an angular velocity sensing signal, and acceleration sensor 2 for outputting an acceleration sensing signal.

A prior art related to the present invention is disclosed, for example, in Japanese Patent Unexamined Publication No. 2005-283481.

The conventional sensor device has a disadvantage of its low detection accuracy.

Let's take an example of an automobile navigation system in a vehicle equipped with the above conventional sensor device. More specifically, let's assume that the above vehicle is traveling in a multistory parking lot. The sensor device uses gravitational acceleration information from acceleration sensor 2 for correcting angular velocity information from angular velocity sensor 1. This enables detection of a spiral travel of the vehicle in the multistory parking lot.

However, in the conventional sensor device, an output on gravitational acceleration from acceleration sensor 2 and an output from angular velocity sensor 1 are not linked on a time-point basis. Accordingly, if there is a difference in time point of signal transmission between a circuit of angular velocity sensor 1 and a circuit of acceleration sensor 2, the angular velocity information cannot be accurately corrected using the gravitational acceleration information from acceleration sensor 2. This results in low detection accuracy.

SUMMARY OF THE INVENTION

An object of the present invention is to improve the detection accuracy of sensor device.

To achieve this object, the present invention includes an angular velocity sensor for outputting an angular velocity sensing signal, and an acceleration sensor for outputting an acceleration sensing signal. A time-point measurement unit is provided for measuring time-point information and adding the time-point information to the angular velocity sensing signal and the acceleration sensing signal. Accordingly, this time-point information links the angular velocity sensing signal to the acceleration sensing signal.

This structure enables an output of the angular velocity sensing signal and the acceleration sensing signal linked by the time-point information. The angular velocity sensing signal can thus be accurately corrected using the acceleration sensing signal. As a result, the detection accuracy of sensor device can be improved.

BRIEF DESCRIPTION OF THE DRAWINGS

FIG. 2 illustrates a response signal of an angular velocity sensor, to which time-point information is added, in the sensor device in accordance with the first exemplary embodiment of the present invention.

FIG. 3 illustrates a response signal of an acceleration sensor, to which the time-point information is added, in the sensor device in accordance with the first exemplary embodiment of the present invention.

DETAILED DESCRIPTION OF THE INVENTION

First Exemplary Embodiment

Figure 1:
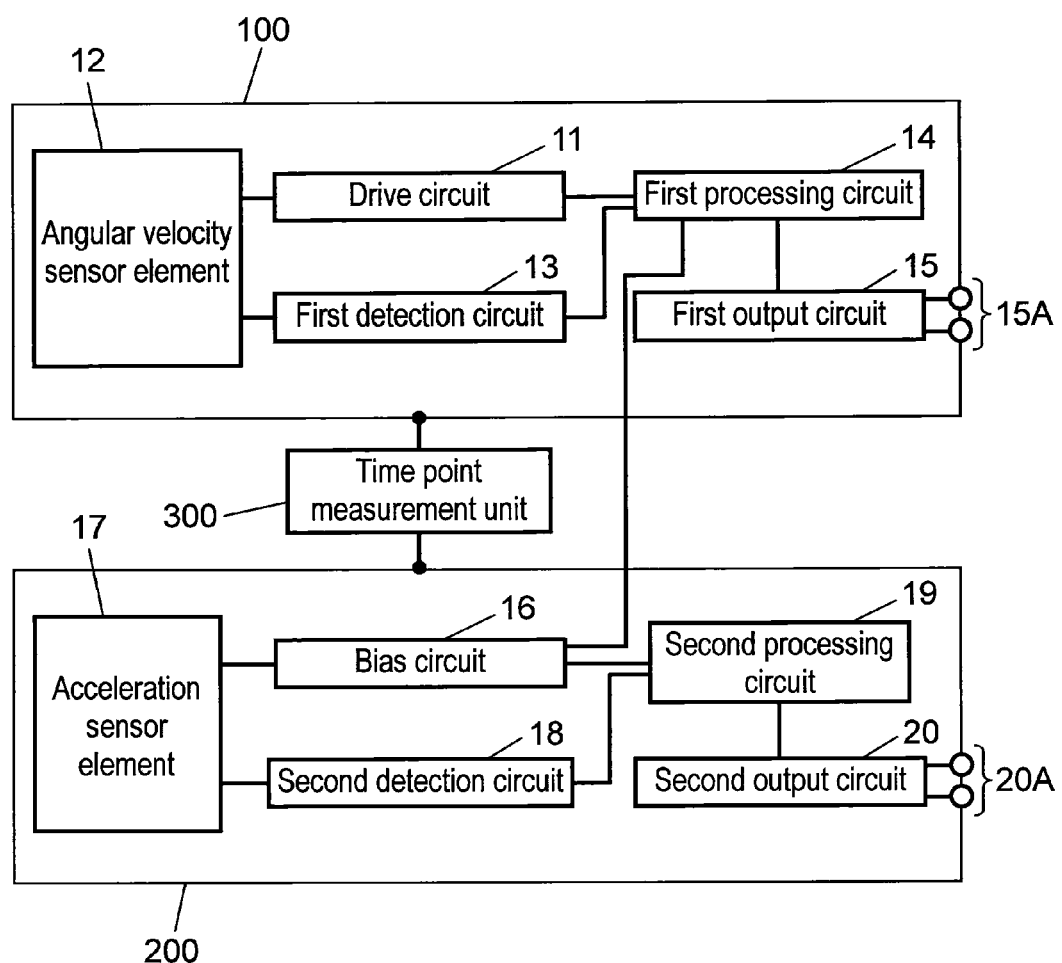
FIG. 1 is an electrical circuit diagram of a sensor device in accordance with the first exemplary embodiment of the present invention.
Figure 4:
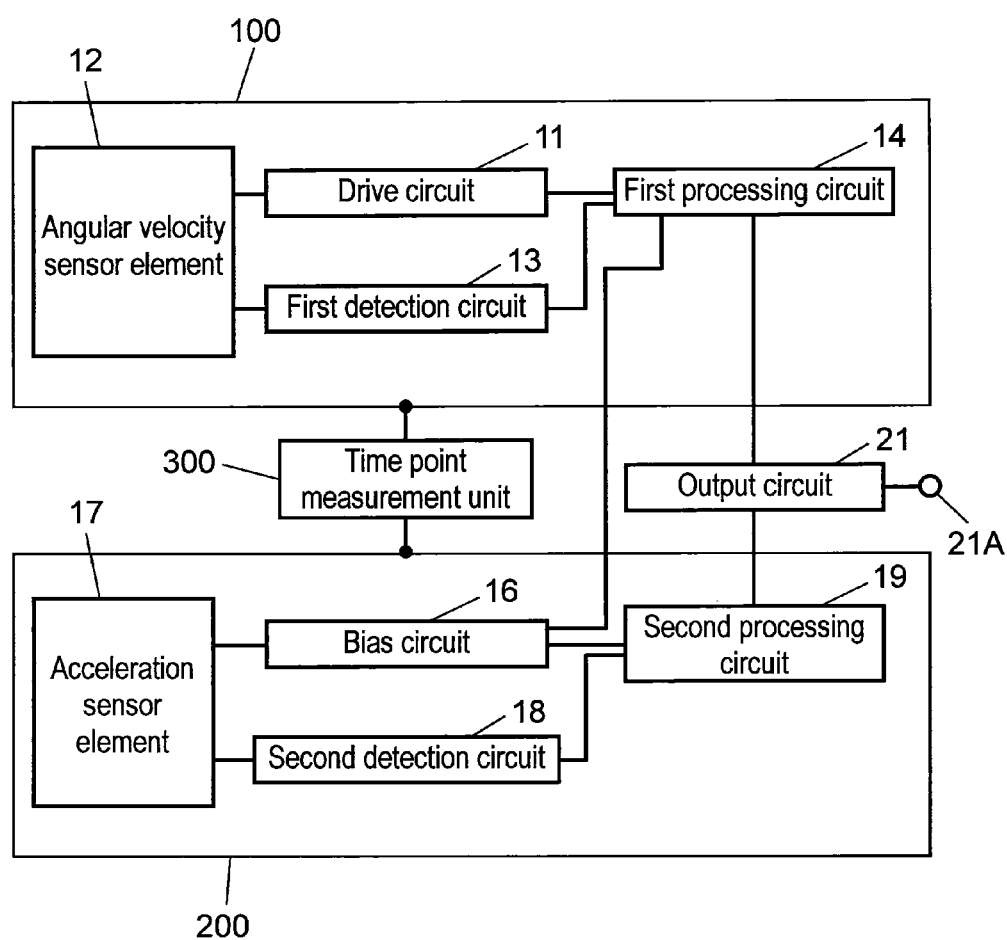
FIG. 4 is an electrical circuit diagram of another sensor device in accordance with the first exemplary embodiment of the present invention.
Figure 5:
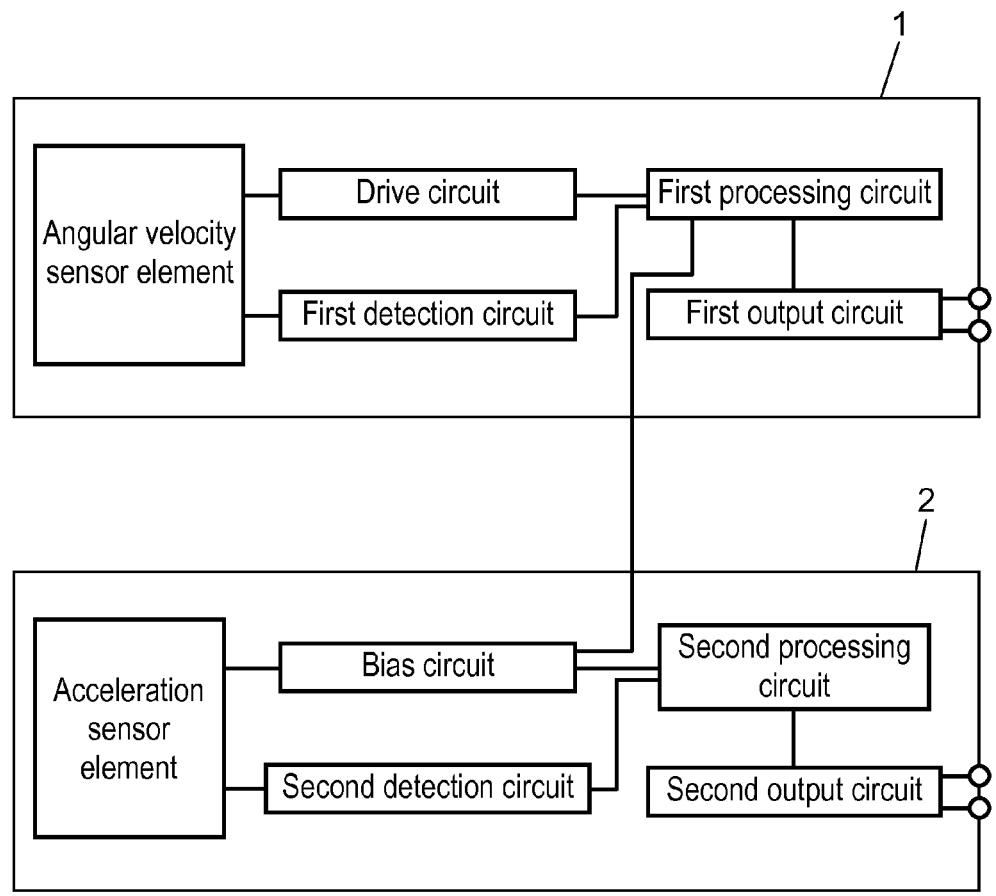
FIG. 5 is an electrical circuit diagram of a conventional sensor device.

An sensor device in the first exemplary embodiment of the present invention is described below with reference to FIGS. 1 to 4. FIG. 1 is an electrical circuit diagram of the sensor device in the first exemplary embodiment of the present invention. FIG. 2 illustrates a response signal of an angular velocity sensor, to which time-point information is added, in the sensor device in the first exemplary embodiment of the present invention. FIG. 3 illustrates a response signal of an acceleration sensor, to which the time-point information is added, in the sensor device in the first exemplary embodiment. FIG. 4 is an electrical circuit diagram of another sensor device in the first exemplary embodiment of the present invention.

In FIG. 1, the sensor device includes angular velocity sensor 100 and acceleration sensor 200.

Angular velocity sensor 100 includes drive circuit 11 for outputting a drive signal that drives an angular velocity sensor element, and angular velocity sensor element 12 that receives the drive signal from drive circuit 11. Angular velocity sensor 100 also includes first detection circuit 13 for taking a response signal from angular velocity sensor element 12, and first processing circuit 14 that receives a response signal from first detection circuit 18. First processing circuit 14 extracts and outputs the angular velocity sensing signal from the response signal. Angular velocity sensor 100 further includes first output circuit 15 with output terminal 15A for outputting the angular velocity sensing signal.

Acceleration sensor 200 includes a bias circuit 16 for outputting a bias signal, and acceleration sensor element 17 that receives the bias signal. Acceleration sensor 200 also includes second detection circuit 18 for taking a response signal from acceleration sensor element 17, and second processing circuit 19 that receives a response signal from second detection circuit 18. Second processing circuit 19 extracts and outputs an acceleration sensing signal from the response signal. Acceleration sensor 200 further includes second output circuit 20 with output terminal 20A for outputting the acceleration sensing signal.

The sensor device includes time-point measurement unit 300 for measuring time-point information and adding the time-point information to angular velocity sensor 100 and acceleration sensor 200. Time-point measurement unit 300 adds the time-point information to the angular velocity sensing signal and the acceleration sensing signal. Accordingly, the angular velocity sensing signal and the acceleration sensing signal are linked by the time-point information.

As a specific example, time-point measurement unit 300 is electrically connected to first detection circuit 13 and second detection circuit 18. The time-point information from time-point measurement unit 300 is added to an output of first detection circuit 13 in angular velocity sensor 100, and to an output of second detection circuit 18 in the acceleration sensor 200, respectively.

First, time-point measurement unit 300 is electrically connected to first detection circuit 13 and second detection circuit 18. This makes the time-point information measured by time-point measurement unit 300 transmitted to first detection circuit 13 and second detection circuit 18.

Next, as shown in FIG. 2, the time-point information (T01 to T99) is added at outputting a response signal (Y011 to Y998) from first detection circuit 13. In the same way, as shown in FIG. 3, the time-point information (T01 to T99) corresponding to the response signal (Y011 to Y998) from first detection circuit 13 is added at outputting a response signal (G011 to G998) from second detection circuit 18.

The response signal (Y011 to Y998) from first detection circuit 13, to which the time-point information (T01 to T99) is added, is output as the angular velocity sensing signal from first output circuit 15 via first processing circuit 14. In the same way, the response signal (G011 to G998) from second detection circuit 18, to which the time-point information (T01 to T99) is added, is output as the acceleration sensing signal from second output circuit 20 via second processing circuit 19. The angular velocity sensing signal and the acceleration sensing signal are output in a state that this time-point information (T01 to T99) is added.

With this structure, the time-point information (T01 to T99) from time-point measurement unit 300 at the same time point is added to the response signal (Y011 to Y998) of detection circuit 13 in angular velocity sensor 100 and the response signal (G011 to G998) of second detection circuit 18 in acceleration sensor 200. This enables output of the angular velocity sensing signal and the acceleration sensing signal linked by the time-point information (T01 to T99). Accordingly, the angular velocity sensing signal can be accurately corrected using the acceleration sensing signal, so as to improve the detection accuracy of the sensor device.

This exemplary embodiment refers to the structure of connecting time-point measurement unit 300 to first detection circuit 13 and second detection circuit 18, and adding the time-point information (T01 to T99) to angular velocity sensor 100 and acceleration sensor 200, respectively, by one time-point measurement unit 300. However, a structure that provides the time-point measurement unit in angular velocity sensor 100 and acceleration sensor 200, respectively, is also applicable. For example, the time-point measurement unit that adds the time-point information (T01 to T99) may be provided in first output circuit 15 in angular velocity sensor 100, and in second processing circuit 19 in acceleration sensor 200. In this case, it needs to be noted that the time-point information after calculating back a time lag between circuits in each circuitry is added to angular velocity sensor 100 and acceleration sensor 200, respectively.

As shown in FIG. 4, common output circuit 21 for outputting the angular velocity sensing signal and acceleration sensing signal from first and second processing circuits 14 and 19 may be provided so as to output angular velocity sensing signal and acceleration sensing signal in a digital format according to the time-division system. This reduces the number of terminals 21A and achieve a smaller sensor device. This output circuit 21 outputs the angular velocity sensing signal and the acceleration sensing signal after interlinking these signals, which are linked based on the time-point information (T01 to T99), according to the time-division system. This structure is preferable because processing for interlinking the angular velocity sensing signal and the acceleration sensing signal, which are linked based on the time-point information (T01 to T99), can be omitted in a control target.

What is claimed is:

1. A sensor device comprising:
   an angular velocity sensor for outputting an angular velocity sensing signal;
   an acceleration sensor for outputting an acceleration sensing signal; and
   a time-point measurement unit for measuring time-point information and adding the time-point information to the angular velocity sensing signal and the acceleration sensing signal independently; and
   an output circuit for receiving the angular velocity sensing signal added with time-point information from the angular velocity sensor and the acceleration sensing signal added with the time-point information from the acceleration sensor, the output circuit for outputting an interlinked signal generated from the angular velocity sensing signal and the acceleration sensing signal based on the time-point information.

2. The sensor device of claim 1, wherein the angular velocity sensor includes:
   a drive circuit for outputting a drive signal that drives an angular velocity sensor element;
   an angular velocity sensor element for receiving the drive signal from the drive circuit;
   a first detection circuit for taking a response signal from the angular velocity sensor element; and
   a first processing circuit for receiving a response signal from the first detection circuit, the first processing circuit extracting and outputting the angular velocity sensing signal from the response signal.

3. The sensor device of claim 1, wherein the acceleration sensor includes:
   a bias circuit for outputting a bias signal;
   an acceleration sensor element for receiving the bias signal;
   a second detection circuit for taking a response signal from the acceleration sensor element; and
   a second processing circuit for receiving a response signal from the second detection circuit, the second processing circuit extracting and outputting the acceleration sensing signal from the response signal.

4. The sensor device of claim 1,
   wherein the output circuit outputs the angular velocity sensing signal and the acceleration sensing signal in a digital format according to a time-division system.

* * * * *